United States Patent
Thomas et al.

(10) Patent No.: US 11,802,659 B1
(45) Date of Patent: Oct. 31, 2023

(54) NON-METALLIC CEILING ELECTRICAL FIXTURE WITH METALLIC BRACKETS

(71) Applicant: ABB Schweiz AG, Baden (CH)

(72) Inventors: Mathew Thomas, Memphis, TN (US); James Wolfe, Memphis, TN (US); Michael O'Neil, Memphis, TN (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/807,136

(22) Filed: Jun. 15, 2022

(51) Int. Cl.
*H02G 3/12* (2006.01)
*F16M 13/02* (2006.01)

(52) U.S. Cl.
CPC .......... *F16M 13/027* (2013.01); *H02G 3/12* (2013.01)

(58) Field of Classification Search
CPC ........ F16M 13/027; H02G 3/12; H02G 3/125; H02G 3/126; H02G 3/121; H02G 3/123; H02G 3/128
USPC ...................................................... 248/27.1
See application file for complete search history.

(56) References Cited

U.S. PATENT DOCUMENTS

| | | | | | |
|---|---|---|---|---|---|
| 835,039 | A | * | 11/1906 | Slocum | H02G 3/123 174/58 |
| 1,026,164 | A | * | 5/1912 | Hoffmann | H02G 3/125 220/3.9 |
| 2,309,189 | A | * | 1/1943 | Hancock | H02G 3/123 220/3.6 |
| 2,639,054 | A | * | 5/1953 | Austin, Jr. | H02G 3/125 220/3.92 |
| 2,917,199 | A | * | 12/1959 | Appleton | H02G 3/121 220/3.7 |
| RE25,593 | E | * | 6/1964 | Palmer | H02G 3/126 220/3.9 |
| 4,943,022 | A | * | 7/1990 | Rinderer | H02G 3/125 248/906 |
| 5,452,873 | A | * | 9/1995 | Laughlin | H02G 3/126 220/3.9 |
| 5,628,419 | A | * | 5/1997 | Putz | H02G 3/123 220/3.9 |
| D408,906 | S | | 4/1999 | Toscano et al. | |
| 6,734,356 | B1 | | 5/2004 | Gretz | |
| 6,956,172 | B2 | * | 10/2005 | Dinh | H02G 3/125 174/53 |
| 6,965,077 | B2 | * | 11/2005 | Halbert | H02G 3/20 174/61 |
| 6,979,779 | B2 | | 12/2005 | Grady | |

(Continued)

FOREIGN PATENT DOCUMENTS

CA 2839211 C 2/2021

*Primary Examiner* — Nkeisha Smith
(74) *Attorney, Agent, or Firm* — Greenberg Traurig, LLP (57) ABSTRACT

A ceiling electrical box can include a housing and a bracket. The housing is defined by a rear wall at a first end, at least one sidewall, and an opening at a second end and includes a first emboss tab, a second emboss tab, a pair of screw holes, a pair of first bores, and a pair of second bores. The bracket includes a first portion, a second portion, a pair of first threaded apertures, and a pair of second threaded apertures. The bracket can include a third portion and a fourth portion extending on a first plane of the first portion. The ceiling electrical box can also include a pair of first fasteners to attach the housing to the bracket and a pair of second fasteners to engage the bracket through the housing, the second fasteners configured to receive a fixture plate for a ceiling fixture.

20 Claims, 6 Drawing Sheets

(56) References Cited

U.S. PATENT DOCUMENTS

| | | | |
|---|---|---|---|
| 7,518,059 B2 * | 4/2009 | Herth | H02G 3/126 |
| | | | 174/53 |
| 7,544,889 B1 * | 6/2009 | Sanchez | H02G 3/126 |
| | | | 174/53 |
| 7,595,448 B2 * | 9/2009 | Herth | H02G 3/126 |
| | | | 174/53 |
| 8,967,575 B1 | 3/2015 | Gretz | |
| 9,496,698 B2 | 11/2016 | Korcz et al. | |
| 9,702,533 B1 | 7/2017 | Harpenau et al. | |
| 9,735,557 B1 | 8/2017 | Gretz | |
| 9,887,524 B1 * | 2/2018 | Gretz | H02G 3/081 |
| 9,912,134 B2 * | 3/2018 | DeBartolo | H02G 3/185 |
| 11,050,230 B1 | 6/2021 | Gretz | |
| 11,460,157 B2 * | 10/2022 | Cohen | F21V 21/048 |
| 11,581,718 B2 * | 2/2023 | Korcz | H02G 3/123 |
| 2013/0320004 A1 * | 12/2013 | Kerr, Jr. | H02G 3/105 |
| | | | 220/3.9 |

* cited by examiner

NON-METALLIC CEILING ELECTRICAL FIXTURE WITH METALLIC BRACKETS

FIELD

The present disclosure relates to the field of electrical wiring, and more particularly to modular ceiling fixture electrical boxes for mounting ceiling fans, ceiling light fixtures, and other electrical devices.

BACKGROUND

Ceiling boxes are used to mount ceiling fixtures including light fixtures, ceiling fans, or similar device onto structural members. In addition to providing an enclosure for electrical wiring, ceiling boxes provide mechanical support to the ceiling fixture. Typically, the electrical boxes are made of a plastic-like material. To attach the ceiling fixture to the structural member, the fixture plate of the ceiling fixture attaches to the electrical box by inserting a threaded fastener into threaded receptacles in the electrical box. However, the integrity of these ceiling boxes can weaken over time due to fatigue at the threaded receptacles, material degradation, and poor installation practices, thereby causing a safety hazard. Alternatively, high load rated ceiling boxes for ceiling fans mount the fixture plate directly onto the metallic bracket. However, high load rated ceiling boxes have higher costs compared to lower load rated ceiling boxes due to the increased costs associated with the heavier metallic brackets.

Typically, ceiling boxes where the fixture plate mounts directly onto the electrical box is used due to their lower cost. Further, due to the increased cost, high load rated ceiling boxes are limited to locations where the installer knows a ceiling fan will be installed. Therefore, ceiling boxes with improved mounting for ceiling fixtures including low load rated ceiling fans is desired.

SUMMARY

In some embodiments, an apparatus for mounting an electrical fixture to a structural member, the apparatus includes a housing having a rear wall at a first end, at least one sidewall extending from the first end to a second end and forming an opening at the second end, and wherein the housing includes: a first emboss tab at a first side of the at least one sidewall, a second emboss tab at a second side of the at least one sidewall, a pair of screw holes extending through the rear wall, a pair of first bores extending through the housing at the first emboss tab and the second emboss tab, and a pair of second bores extending through the housing at the first emboss tab and the second emboss tab; and a bracket, the bracket including: a first portion on a first plane, a second portion on a second plane, a pair of first threaded apertures extending through the first portion, a pair of second threaded apertures extending through the first portion, and a plurality of mounting holes extending through the second portion and configured to receive a plurality of fasteners to mount the bracket to the structural member; wherein the pair of first threaded apertures are configured to align with the pair of screw holes and the pair of second threaded apertures are configured to align with the pair of first bores.

In some embodiments, the apparatus includes a pair of first fasteners at the pair of screw holes to attach the housing to the bracket; and a pair of second fasteners at the pair of first bores to engaging the bracket, wherein the pair of second fasteners are configured to engage a first fixture plate.

In some embodiments, the pair of second bores is configured to engage a pair of third fasteners inserted into the pair of second bores; and wherein the pair of second bores mechanically deform in response to the third fasteners being threadingly inserted into the pair of second bores; wherein the pair of third fasteners are configured to engage a second fixture plate.

In some embodiments, the first portion extends in a first direction on the first plane, and wherein the bracket further includes: a third portion extending in a second direction on the first plane; wherein an aperture of the pair of second threaded apertures is disposed on the third portion.

In some embodiments, the bracket further includes wherein the first portion and the second portion intersect to form approximately a 90° angle, and wherein the bracket further includes a gusset disposed at an intersection of the first portion and the second portion.

In some embodiments, the bracket further includes: a fourth portion extending in a third direction on the first plane, wherein the fourth portion is opposite from the third portion at the first portion; wherein the other aperture of the pair of second threaded apertures is disposed on the fourth portion.

In some embodiments, an axis of the second direction is at approximately a 45° angle from an axis of the first direction.

In some embodiments, the second portion is offset from the first portion to form a channel extending between a first segment and a second segment of the first portion, wherein the bracket is configured to receive a bar hanger between the bracket and the housing through the channel, and wherein the bar hanger is configured to mount the bracket to the structural member.

In some embodiments, the bar hanger includes an outer bar and an inner bar, the outer bar having a second channel along a lengthwise axis of the outer bar, wherein the inner bar fits inside the second channel to extend from the second channel to telescopically adjust a length of the bar hanger.

In some embodiments, the bracket further includes: a first flange disposed at an end of the third portion, and a second flange disposed at an end of the fourth portion, wherein the first flange and the second flange extend around the housing towards the second end.

In some embodiments, each of the first flange and the second flange further include at least one emboss portion at an intersection of the first flange or the second flange and the third portion and the fourth portion.

In some embodiments, the bracket further includes: a first emboss segment disposed on the first portion, a second emboss segment disposed on the third portion, and a third emboss segment disposed on the fourth portion, wherein the first emboss segment, the second emboss segment, and the third emboss segment provide support to a rigidity of the bracket.

In some embodiments, a system for mounting electrical fixtures to a structural member, the system includes a housing having a rear wall at a first end, at least one sidewall extending from the first end to a second end and forming an opening at the second end, the housing including: a first emboss tab at a first side of the at least one sidewall, a second emboss tab at a second side of the at least one sidewall, a pair of screw holes extending through the rear wall, a pair of first bores extending through the housing at the first emboss tab and the second emboss tab, and a pair of second bores extending through the housing at the first emboss tab and the second emboss tab; a bracket for mounting the housing to the structural member, the bracket including: a first portion on a first plane at the first end of the housing, a second portion on a second plane, a pair of first threaded apertures extending through the first portion and aligning with the pair of screw holes, a pair of second threaded apertures extending through the first portion and aligning with the pair of first bores, and a plurality of mounting holes extending through the second portion and configured to receive a plurality of fasteners; a pair of first fasteners to attach the housing to the bracket; a pair of second fasteners to threadingly engage the bracket, wherein the pair of second fasteners are configured to engage a first fixture plate; wherein the pair of first threaded apertures align with the pair of screw holes and the pair of second threaded apertures align with the pair of first bores; wherein the pair of second bores mechanically deform in response to a pair of third fasteners being threadedly inserted into the pair of second bores to mount a second fixture plate.

In some embodiments, the first portion extends in a first direction, and wherein the bracket further includes: a third portion extending in a second direction on the first plane, wherein an aperture of the pair of second threaded apertures is disposed on the third portion.

In some embodiments, the techniques described herein relate to a system, wherein the bracket further includes: a fourth portion extending in a third direction opposite the second direction on the first plane, wherein the other aperture of the pair of second threaded apertures is disposed on the fourth portion.

In some embodiments, the second direction is angularly offset from the first direction by a 45° angle.

In some embodiments, the bracket further includes wherein the first portion and the second portion intersect to form approximately a 90° angle, and wherein the bracket further includes a gusset disposed at an intersection of the first portion and the second portion.

In some embodiments, the bracket further includes wherein the second portion is offset from the first portion to form a channel extending between a first segment and a second segment of the first portion, wherein the bracket is configured to receive a bar hanger between the bracket and the housing through the channel, and wherein the bar hanger is configured to mount the bracket to the structural member.

In some embodiments, the bracket further includes a first emboss segment disposed on the first portion, a second emboss segment disposed on the third portion, a third emboss segment disposed on the fourth portion, a first flange disposed at an end of the third portion, and a second flange disposed at an end of the fourth portion, wherein the first emboss segment, the second emboss segment, and the third emboss segment provide added support to a rigidity of the bracket, wherein the first flange and the second flange extend around a periphery of the housing towards the second end.

In some embodiments, each of the first flange and the second flange further include at least one emboss portion at an intersection of the first flange and the second flange and a respective third portion and the fourth portion.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Ceiling boxes are used to mount lighting fixtures, including ceiling lights and/or ceiling fans, onto a structural member. For example, a ceiling box can include an electrical box and/or a bracket. The electrical box houses the electrical wiring and associated connectors of the lighting fixture and the wiring providing power to the lighting fixture. The electrical box can also connect to the fixture plate of the lighting fixture. The bracket can mount the electrical box and/or the lighting fixture to the structural member. Typically, low rated loads can be mounted to the electrical housing, whereas high rated loads are generally mounted to the bracket for improved retention. Existing ceiling boxes are described in U.S. Pat. No. 7,518,059 of Herth and U.S. Pat. No. 6,734,356 of Gretz.

Herth '059 describes an electrical box having an internal bracket and threaded receptacles for mounting a fixture plate of a ceiling fixture onto the electrical box. The metal bracket includes carriage bolts projecting outside the electrical box at the electrical box opening. The protruding bolts interferes with placement of the fixture plate for certain light fixtures and limits installation locations of the ceiling box. Further, the close position of the three mounting screws relative to each other reduce the effectiveness of mounting.

Gretz '356 describes a ceiling box having a bracket to attach the electrical box to a structural surface. The metal bracket includes side walls extending along a side of the bracket and is mounted to the structural member by fasteners extending through the sidewall. However, the ceiling box is limited to high load rated ceiling fans and does not accommodate lighting fixtures of different sizes. Further, the electrical box includes fasteners for receiving a fixture plate that extend through an interior of the electrical box, thereby increasing a safety hazard from electrical components.

Figure 1:
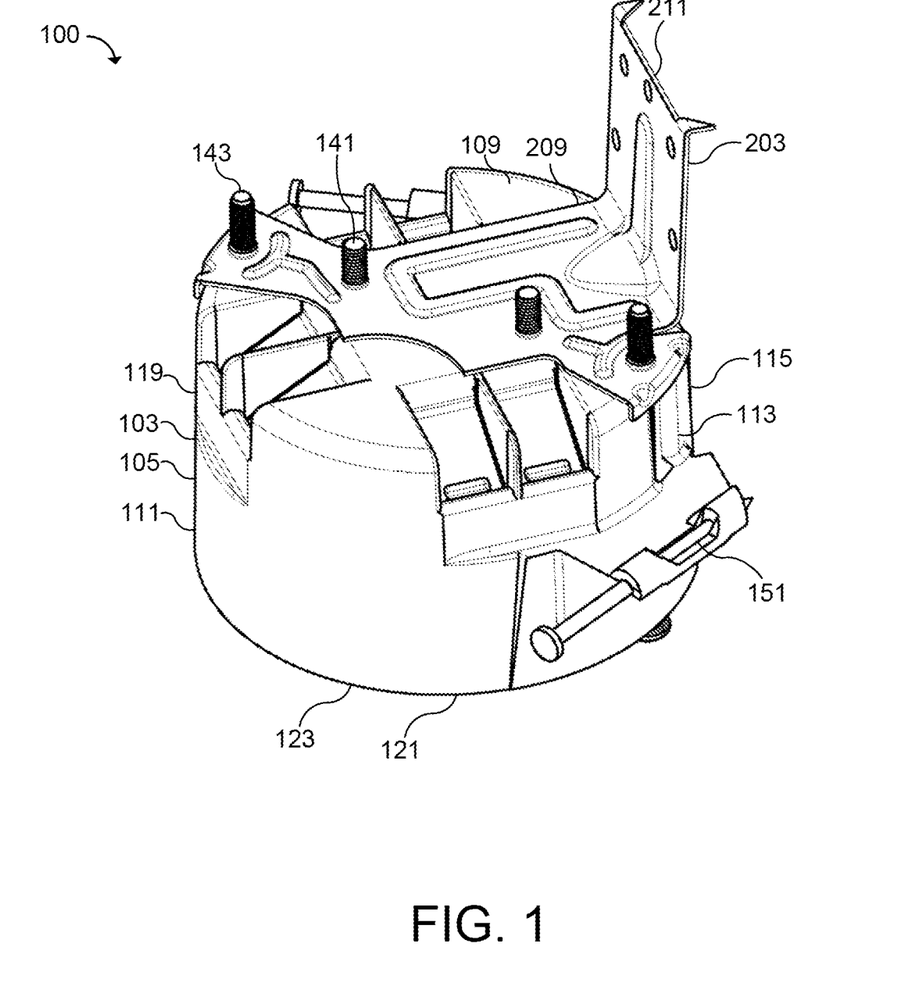
FIG. 1 shows a perspective view of a ceiling box including an electrical box and a bracket, according to some embodiments.

FIG. 1 shows a perspective view of a ceiling box 100 including an electrical box 103 and a bracket 203, according to some embodiments. The ceiling box 100 can include an electrical box 103 and a bracket 203.

The electrical box 103 can have a first end 109 and a second end 121 opposite the first end 109. The electrical box 103 can include a rear wall 107 at the first end 109, at least one sidewall 111, and an opening 123 at the second end 121 that define a housing 105. In some embodiments, the at least one sidewall 111 can include a emboss tab 113 (FIG. 2) at a first side 115 and a emboss tab 117 (FIG. 2) at a second side 119 of the at least one sidewall 111 opposite the first side 115. Each of the emboss tab 113 and the emboss tab 117 inwardly extend from the at least one sidewall 111. In the illustrated embodiment, the housing 105 is cylindrically shaped. It is to be appreciated that other geometries for the housing 105 are possible and that the shape is exemplary. Additional geometries are possible in accordance with the remaining disclosure.

Figure 2:
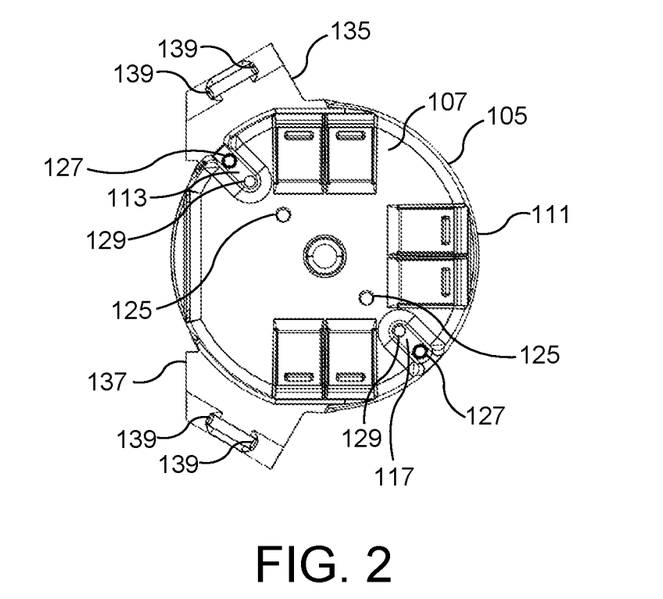
FIG. 2 shows a top view of the electrical box, according to some embodiments.

FIG. 2 shows a top view of the electrical box 103, according to some embodiments.

Figure 3:
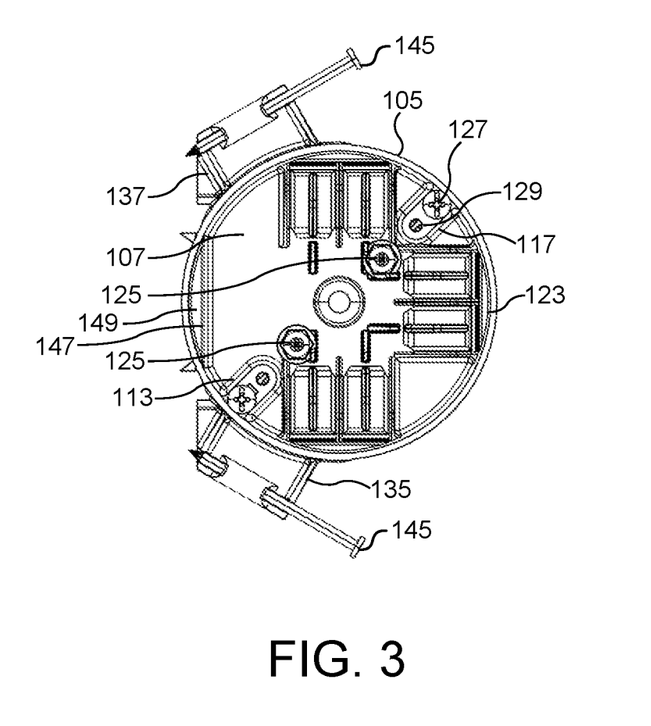
FIG. 3 shows a bottom view of the electrical box, according to some embodiments.
Figure 4:
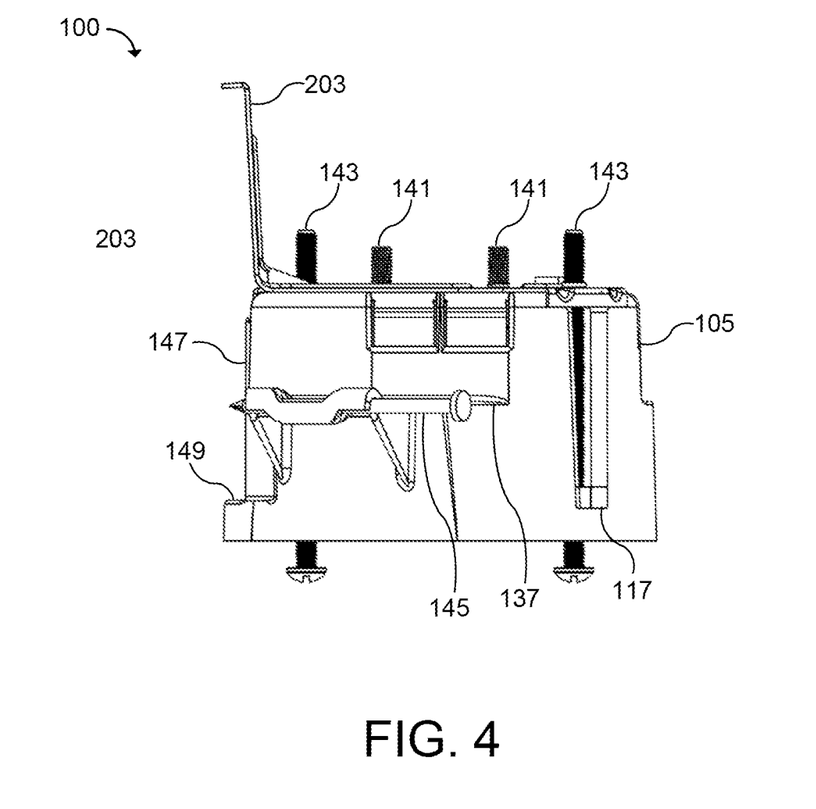
FIG. 4 shows a side view of the ceiling box, according to some embodiments.

FIG. 3 shows a bottom view of the electrical box 103, according to some embodiments. FIG. 4 shows a side view of the ceiling box 100, according to some embodiments.

The housing 105 can include a screw hole 125. The screw hole 125 can extend through the rear wall 107 and form an aperture through the rear wall 107. In some embodiments, the housing 105 can include a pair of screw hole 125. In some embodiments, the housing 105 can include three screw holes 125. In some embodiments, the housing 105 can include four or more screw holes 125. In some embodiments, the housing 105 can include a plurality of screw hole 125.

The housing 105 can include a bore 127. In some embodiments, the bore 127 extends though the housing 105. In some embodiments, the bore 127 can be configured to receive a fastener that attaches to the bracket 203. In some embodiments, the housing 105 can include a pair of bore 127. In some embodiments, the pair of bore 127 can be configured to receive a pair of fastener 143 to couple a ceiling fan/light fixture plate to the ceiling box 100. In some embodiments, each of the emboss tab 113 and the emboss tab 117 can include the bore 127 extending through the emboss tab 113 and the emboss tab 117 to form an aperture. The bore 127 on the emboss tab 113 and the bore 127 on the emboss tab 117 can be spaced a first distance apart. In some embodiments, the first distance can be 3.5" wide. In some embodiments, the first distance can be less than 3.5" wide. In some embodiments, the first distance can be greater than 3.5" wide. In some embodiments, the distance between the bore 127 on the emboss tab 113 and the bore 127 on the first side 115 can be based on the size of the fixture plate being mounted to the bracket 203.

In some embodiments, the housing 105 can include a bore 129. In some embodiments, the bore 129 may be configured to receive a fastener to attach the fixture plate to the bracket 203. In some embodiments, the bore 129 fully extends through the emboss tab 113 and the first side 115 to allow the fasteners to extend through the emboss tab 113 and the emboss tab 117 and to engage each of the threaded apertures 249 on the bracket 203. In some embodiments, the bore 129 partially extends through the emboss tab 113 and the emboss tab 117. In some embodiments, the bore 129 can be configured to receive a fastener to attach a fixture plate to the housing 105. In some embodiments, the bore 129 can be configured to mechanically deform in response to threadingly inserting a fastener into the bore 129. The bore 129 on the emboss tab 113 and the bore 129 on the emboss tab 117 can be spaced a second distance apart. In some embodiments, the second distance can be 2.75" wide. In some embodiments, the second distance can be less than 2.75" wide. In some embodiments, the first distance can be greater than 2.75" wide. In some embodiments, the distance between the bore 129 on the emboss tab 113 and the bore 129 on the first side 115 can be based on the size of the fixture plate being mounted to the bracket 203. In some embodiments, the second distance can be less than the first distance to accommodate a smaller fixture plate than the pair of bore 127.

In some embodiments, the bore 127 can include a first width diameter and can be configured to receive a fastener having a first size. In some embodiments, the bore 129 can include a second width diameter and can be configured to receive a fastener having a second size. In some embodiments, the first width diameter and the second width diameter can be substantially similar widths to receive fasteners of substantially similar size. In some embodiments, the first width diameter and the second width diameter can be the same widths. In some embodiments, the first width diameter can be wider than the second width diameter and the fastener having the first size can be larger than the fastener having the second size. In some embodiments, the first width diameter can be narrower than the second width diameter and the fastener having the first size can be a smaller size than the fastener having the second size. In some embodiments, the bore 127 can include a threaded inner surface. In some embodiments, the bore 129 can include a threaded inner surface. In some embodiments, the bore 127 and/or the bore 129 can include a threaded inner surface configured to receive a threaded fastener.

In some embodiments, the housing 105 can include a tab 135 and a tab 137. In some embodiments, the tab 135 and the tab 137 radially extend from an exterior surface of the at least one sidewall 111. In some embodiments, the tab 135 and the tab 137 can include a bore 139 disposed at an outer end of the tab 135 and the tab 137. The tab 137 can be configured to receive a fastener 145 to engage the structural member to mount the housing 105 to the structural member. Each bore of the pair of bore 139 can be angularly positioned through the bore 139 so the fastener 145 engages the structural surface at a predetermined angle. In some embodiments, the predetermined angle can be approximately 45°. In some embodiments, the predetermined angle can be 45°. In some embodiments, the predetermined angle can be less than 45°. In some embodiments, the predetermined angle can be more than 45°.

In some embodiments, the at least one sidewall 111 of the housing 105 can include a flat planar segment 147 located between the tab 135 and the tab 137. In some embodiments, the flat planar segment 147 can extend from the first end 109 and towards the second end 121 to form a step 149 so that the housing 105 at the first end 109 is arcuate and the housing 105 at the second end 121 is substantially circular. In some embodiments, the step 149 can be located at an end of the flat planar segment 147 proximate the second end 121 and protrudes from the flat planar segment 147 to form a ledge configured to abut an edge of the structural member when installing the ceiling box 100. Further, in some embodiments, the step 149 may be configured to position the opening 123 of the housing 105 at the second end 121 a predetermined distance from the end of the structural member.

The housing 105 can accommodate electrical conductors, electrical connectors, and similar components for mounting a ceiling fixture. In some embodiments, housing 105 can include a plurality of apertures and/or push-in covers for extending electrical conductors from an exterior of the housing 105 to an interior of housing 105 in the receptacle.

Figure 5:
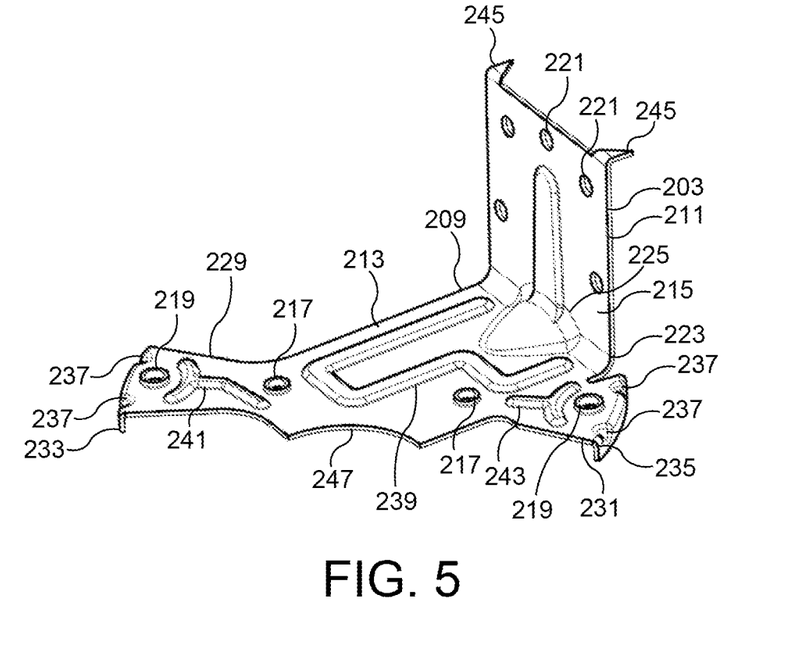
FIG. 5 shows a perspective view of the bracket, according to some embodiments.
Figure 6:
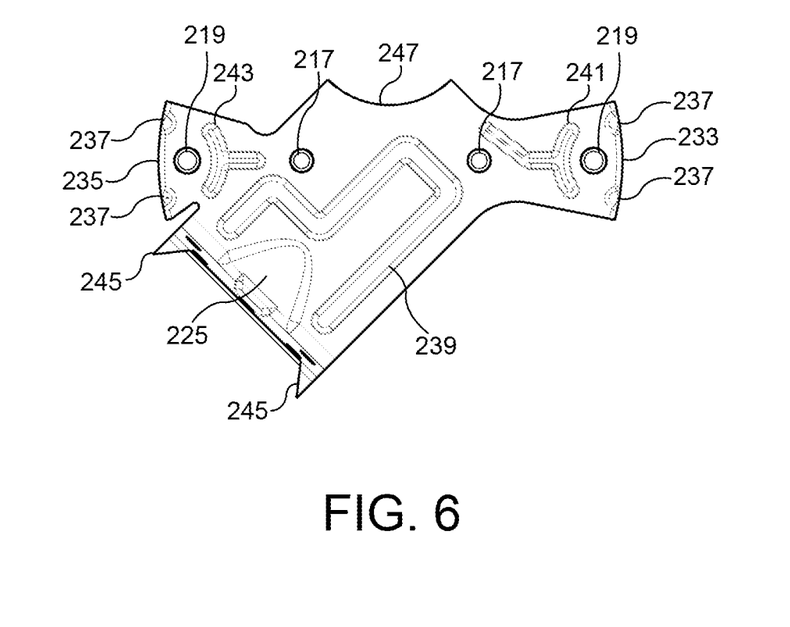
FIG. 6 shows a top view of the bracket, according to some embodiments.
Figure 7:
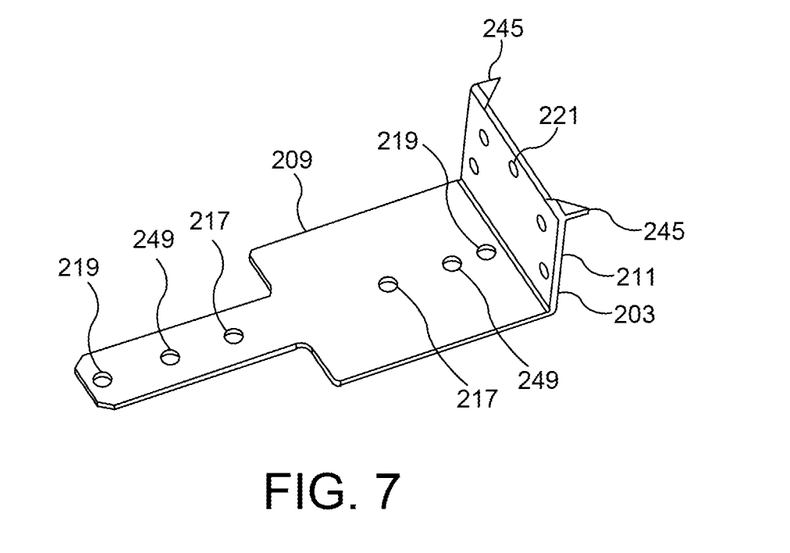
FIG. 7 shows a perspective view of the bracket, according to some embodiments.

FIG. 5 shows a perspective view of the bracket 203, according to some embodiments. FIG. 6 shows a top view of the bracket 203, according to some embodiments. FIG. 7 shows a perspective view of the bracket 203, according to some embodiments. In the illustrated embodiment, the bracket 203 is L-shaped. It is to be appreciated that other geometries for the bracket 203 are possible and that the L-shape is exemplary. For example, the bracket 203 can be U-shaped. Additional geometries are possible in accordance with the remaining disclosure. The bracket 203 can include, at least, a first portion 209 and a second portion 211. The first portion 209 can be on a first plane 213 and extend along a first direction. The first portion 209 fits at the first end 109 of housing 105 opposite the second end 121 of housing 105. The second portion 211 can be contiguously connected to the first portion 209 and extend on a second plane 215.

In some embodiments, the first portion 209 and the second portion 211 can form an intersection 223 where a respective edge of the first portion 209 and the second portion 211 contiguously connect. In some embodiments, the angle of the intersection 223 of the first portion 209 and the second portion 211 can be substantially perpendicular. In some embodiments, the angle of intersection 223 between the first plane 213 and the second plane 215 can be approximately a 90° angle. In some embodiments, the angle of the intersection 223 between the first plane 213 and the second plane 215 can be less than 90°. In some embodiments, the angle of the intersection 223 between the first plane 213 and the second plane 215 can be greater than 90°. In some embodiments, the bracket 203 can be formed from a single piece. In some embodiments, the bracket 203 can include at least two pieces that can be joined together to form the bracket 203 by any of a plurality of methods including, but not limited to, pressing, stamping, cutting, welding, forging, filing, bending, other processes, and combinations thereof.

In some embodiments, the bracket 203 can include a gusset 225 disposed at the intersection 223. The gusset 225 provides support for the bracket 203 at the intersection 223 to prevent a mechanical deformation of the bracket 203 and the intersection 223 in response to a load being placed onto the bracket 203. In some embodiments, the gusset 225 can extend along at least a portion of the intersection 223 and can further extend along a portion of each of the first portion 209 and the second portion 211. The gusset 225 is raised from the surface of the bracket 203 in a direction opposite housing 105 when housing 105 is attached to the bracket 203.

In some embodiments, the bracket 203 can include a mounting hole 221. The mounting hole 221 is configured to extend through the bracket 203 to form an aperture through the bracket 203. The mounting holes 221 can receive a fastener to mount the bracket 203 to the structural member. In some embodiments, the housing 105 can be attached to the bracket 203 when mounting the bracket 203 to the structural member by inserting fasteners through the bracket 203. In some embodiments, the mounting holes 221 can be disposed on the second portion 211. In some embodiments, the second portion 211 can include a plurality of mounting holes 221. In some embodiments, the plurality of mounting holes 221 can be spaced apart along a surface of the second portion 211 to improve the retaining strength of the bracket 203 to the structural member. In some embodiments, the second portion 211 can include two mounting holes 221. In some embodiments, the second portion 211 can include three mounting holes 221. In some embodiments, the second portion 211 can include four mounting holes 221. In some embodiments, the second portion 211 can include five mounting holes 221. In some embodiments, the second portion 211 can include more than five mounting holes 221.

In some embodiments, the bracket 203 can include a pointed ear 245 disposed at an end of the bracket 203. In some embodiments, the pointed ears 245 can be disposed on the second portion 211 at the opposite end from the first portion 209. In some embodiments, the pointed ears 245 can be configured to extend towards the structural member when the bracket 203 is mounted to the structural member. The pointed ear 245 can be configured to insert into the structural member after aligning the bracket 203 and prior to installing any fasteners through the bracket 203. The pointed ears 245 can be inserted into the structural member prior to mounting the bracket 203 to retain a position of the bracket 203 onto the structural member during installation. In some embodiments, the second portion 211 can include at least one pointed ear 245. In some embodiments, the second portion 211 can include two pointed ears 245. In some embodiments, the second portion 211 can include two or more pointed ears 245.

In some embodiments, the bracket 203 can include a third portion 229. In some embodiments, the third portion 229 can extend on the first plane 213 in a second direction from the first portion 209. In some embodiments, the second direction can be the same direction as the first direction. In some embodiments, an angle between an axis of the first direction and an axis of the second direction can be approximately 45°. In some embodiments, the angle between the first direction and the second direction can be 45°. In some embodiments, the third portion 229 can include the threaded aperture 219, the threaded aperture 219 aligning with the bore 127 extending through the emboss tab 113. In some embodiments, the fastener 141 can extend through the bore 127 and engage with the threaded aperture 219 on the third portion 229. In some embodiments, the third portion 229 can include a threaded aperture 249, the threaded aperture 249 aligning with the bore 129 extending through the emboss tab 113. In some embodiments, the fastener 141 can extend through the bore 129 and engage with the threaded aperture 249 on the third portion 229. In other embodiments, a fastener having a smaller diameter than fastener 141 can extend through the bore 129 and the threaded aperture 249 to engage the third portion 229.

In some embodiments, the bracket 203 can include a fourth portion 231. In some embodiments, the fourth portion 231 can extend on the first plane 213 in a third direction from the first portion 209. In some embodiments, the third portion 229 and the fourth portion 231 can be disposed at opposing ends of the first portion 209. In some embodiments, the angle between the axis of the second direction and an axis of the third direction can be approximately 180°. In some embodiments, the angle between the second direction and the third direction can be 180°. Consequently, in some embodiments, the third direction can be an opposite direction from the second direction on the first plane 213. In some embodiments, the fourth portion 231 can include the threaded aperture 219, the threaded aperture 219 aligning with the bore 127 extending through the emboss tab 117. In some embodiments, the fastener 141 can extend through the bore 127 and engage with the threaded aperture 219 on the fourth portion 231. In some embodiments, the fourth portion 231 can include the threaded aperture 249, the threaded aperture 249 aligning with the bore 129 extending through the emboss tab 117. In some embodiments, the fastener 141 can extend through the bore 129 and engage with the threaded aperture 249 on the fourth portion 231. In other embodiments, a fastener having a smaller diameter than fastener 141 can extend through the bore 129 and the threaded aperture 249 to engage the fourth portion 231.

In some embodiments, a width of the first portion 209 and the second portion 211 can be a first width. In some embodiments, a width of the third portion 229 and the fourth portion 231 can be a second width. In some embodiments, the second width can be narrower than the first width. In some embodiments, the second width can be approximately 0.50".

The bracket 203 can include threaded aperture 217. The threaded aperture 217 can be configured to receive a fastener 141. In some embodiments, the threaded aperture 217 can be located on the first portion 209. In some embodiments, the threaded aperture 217 can align with the screw hole 125 on the housing 105. In some embodiments, the threaded aperture 217 can have a first diameter width. In some embodiments, the size, shape, diameter, thread size, and other factors for each of the threaded aperture 217 can be based on any of a plurality of factors including, but not limited to, the size of the fastener 141, as will be further discussed below.

The bracket 203 can include threaded aperture 219. The threaded aperture 219 can be configured to receive a fastener 143. In some embodiments, the threaded aperture 219 can be located on the first portion 209. In some embodiments, the third portion 229 and the fourth portion 231 can include the threaded aperture 219. In some embodiments, the threaded aperture 219 can align with the bore 127. In some embodiments, the bracket 203 can include a pair of threaded apertures 219, each threaded aperture 219 aligning with the pair of bore 127 of the housing 105. In some embodiments, the threaded aperture 219 can have a second diameter width. In some embodiments, the size, shape, diameter, thread size, and other factors for each of the threaded aperture 219 can be based on any of a plurality of factors including, but not limited to, the size of the fastener 141, as will be further discussed below. In some embodiments, the first width and the second width can be substantially similar. In some embodiments, the first width can be narrower than the second width. For example, the threaded aperture 217 can be configured to receive a threaded fastener for mounting a lighting fixture plate and the threaded aperture 219 can be configured to receive a threaded fastener for mounting a ceiling fan fixture plate, the fasteners for the lighting fixture plate being a smaller sized fastener than the fasteners for the ceiling fan fixture plate. In some embodiments, the first width can be wider than the second width.

In some embodiments, the threaded aperture 217 can include an extruded hole.

In some embodiments, the threaded aperture 219 can include the extruded hole. In some embodiments, each of the plurality of threaded aperture 217 and the threaded aperture 219 on the bracket 203 can include extruded holes. The extruded holes can be configured to provide added retaining support for the fasteners to engage the bracket 203. In some embodiments, the threaded aperture 217 and the threaded aperture 219 can include a threaded interior surface extending through the threaded aperture 217 and the threaded aperture 219 and along the inner surface of the extrusion to provide an increased surface area for each fastener to engage.

In some embodiments, bracket 203 can include a flange 233. In some embodiments, the flange 233 can be located at an end of the third portion 229. In some embodiments, the bracket 203 can include a flange 235. In some embodiments, the flange 235 can be disposed at an end of the fourth portion 231. The flange 233 and the flange 235 can provide increased mechanical strength to the bracket 203 at the third portion 229 and the fourth portion 231, respectively. In some embodiments, the flange 233 and the flange 235 can extend towards the second end 121 of the housing 105 at approximately a 90° angle.

In some embodiments, the bracket 203 can include an emboss portion 237. In some embodiments, the emboss portion 237 can be located at the intersection of the flange 233 and the third portion 229. In some embodiments, the emboss portion 237 can be located at the intersection of the flange 235 and the fourth portion 231. The emboss portion 237 extends towards the corner of the housing 105 formed by the rear wall 107 and the at least one sidewall 111 from the intersection of the third portion 229 or the fourth portion 231. The emboss portion 237 retains the ends of the third portion 229 and the fourth portion 231 engaged with the corner of the housing 105 when the bracket 203 is coupled to the housing 105 and when the ceiling fan/light fixture is secured to the bracket 203. In some embodiments, the bracket 203 can include a plurality of emboss portion 237. In some embodiments, each of the third portion 229 and the fourth portion 231 can include a pair of emboss portion 237.

In some embodiments, the bracket 203 can include an emboss segment 239. In some embodiment, the emboss segment 239 can be disposed on the first portion 209. In some embodiments, the emboss segment 239 can be u-shaped. It is to be appreciated that other geometries for the emboss segment 239 are possible and that the u-shape is exemplary. Additional geometries are possible in accordance with the remaining disclosure. In some embodiments, the bracket 203 can include an emboss segment 241. In some embodiments, the emboss segment 241 can be disposed on the third portion 229. In some embodiments, the emboss segment 241 can be disposed on at least part of the third portion 229. In some embodiments, the 241 can be disposed on the third portion 229 and the first portion 209. In some embodiments, the emboss segment 241 can be y shaped. In some embodiments, the emboss segment 241 can include a columnal segment extending towards the first portion 209. In some embodiments, the columnal segment of the emboss segment 241 can angularly extend around the threaded aperture 217 of the first portion 209. It is to be appreciated that other geometries for the emboss segment 241 are possible and that the y shape is exemplary. Additional geometries are possible in accordance with the remaining disclosure. In some embodiments, the bracket 203 can include an emboss segment 243. In some embodiments, the emboss segment 243 can be disposed on the fourth portion 231. In some embodiments, the emboss segment 243 can be disposed on at least part of the fourth portion 231. In some embodiments, the emboss segment 243 can be y shaped. It is to be appreciated that other geometries for the emboss segment 243 are possible and that the y shape is exemplary. Additional geometries are possible in accordance with the remaining disclosure. The emboss segments provide added mechanical support to the bracket 203. Further, the emboss segments provide added rigidity and added resistance against mechanical deformation when the electrical fixture is mounted to the bracket 203 and the structural member. In some embodiments, the emboss segment 239 can be a first emboss segment 239. In some embodiments, the emboss segment 241 can be a second emboss segment 241. In some embodiments, the emboss segment 243 can be a third emboss segment 243.

In some embodiments, the bracket 203 can have arcuate cutouts 247 disposed along a periphery of the bracket 203. The arcuate cutouts 247 can reduce the overall amount of material that is required to form the bracket 203, thereby reducing the cost of the bracket 203. For example, in some embodiments, the first portion 209 of the bracket 203 can have an arcuate cutout 247 at a corner of the first portion 209 located between the third portion 229 and the fourth portion 231.

In some embodiments, the ceiling box 100 can include fastener 141. In some embodiments, the ceiling box 100 can include a pair of fasteners 141. The fastener 141 can couple the housing 105 to the bracket 203 at the pair of screw holes 125. In some embodiments, the fastener 141 can include any of a plurality of fasteners including, but not limited to, screws, bolts, nuts, rivets, nails, lag bolts, anchor bolts, other fasteners, and combinations thereof. In some embodiments, the fastener 141 can be screws. In some embodiments, the fastener 141 can be bolts.

In some embodiments, the ceiling box 100 can include fastener 143. In some embodiments, the ceiling box 100 can include a pair of fasteners 143. The fastener 143 are configured to extend through the housing 105 at the bore 127 and threadingly engage the bracket 203. In some embodiments, the fastener 143 can threadingly engage the threaded aperture 219. The fastener 143 can be located at the bore 127 and can be configured to receive the first fixture plate having the first size. For example, in some embodiments, each fastener of the pair of fasteners 143 can include a pan head to be inserted into apertures on the first fixture plate, the apertures being sized to receive the pan head at one end and retain the pan head at the other end. In some embodiments, the fastener 143 can include any of a plurality of fasteners including, but not limited to, screws, bolts, nuts, rivets, nails, lag bolts, anchor bolts, other fasteners, and combinations thereof. In some embodiments, the fastener 143 can be screws. In some embodiments, the fastener 143 can be bolts.

In some embodiments, the ceiling box 100 can include fastener 151. In some embodiments, the ceiling box 100 can include a pair of fasteners 151. The fastener 151 can couple the housing 105 to the structural member. The fastener 151 can be located at the pair of bore 139 and configured to engage the structural member to mount the housing 105. In some embodiments, the fastener 151 can include any of a plurality of fasteners including, but not limited to, screws, nuts, bolts, nails, lag bolts, anchor bolts, other fasteners, and combinations thereof. In some embodiments, the fastener 151 can be a nail.

In some embodiments, the bracket 203 can be positioned onto the first end 109 of the housing 105, the pair of screw holes 125 aligning with the pair of threaded apertures 217 and the pair of bore 127 aligning with the pair of threaded apertures 219. In some embodiments, the housing 105 can be attached to the bracket 203 by inserting a pair of fasteners 141 through the pair of screw holes 125 to engage the bracket 203 at the pair of threaded apertures 217. Further, in some embodiments, the pair of bore 127 can receive the pair of fasteners 143 to engage the bracket 203 at the pair of threaded apertures 219 to receive the first fixture plate.

Referring to FIG. 7, in some embodiments, the bracket 203 can include threaded aperture 249. In some embodiments, the bracket 203 can include a pair of threaded apertures 249. In some embodiments, the bracket 203 can include a plurality of threaded apertures 249. The threaded aperture 249 can be located on the first portion 209. In some embodiments, the threaded aperture 249 can be located on the first portion 209, the third portion 229, the fourth portion 231, and combinations thereof. For example, in one embodiment, the bracket 203 can include a threaded aperture 249 disposed on the third portion 229 and another threaded aperture 249 disposed on the fourth portion 231. In another embodiments, the bracket 203 can include a threaded aperture 249 disposed on the first portion 209 and another threaded aperture disposed on the third portion 229. In some embodiments, the threaded aperture 249 can be configured to receive a fastener to mount an electrical fixture plate to the bracket 203. In some embodiments, the threaded aperture 249 can receive the fastener 143 located in the bore 129 and engaging the threaded aperture 249. For example, in some embodiments, the fasteners 143 can be relocated from the bore 127 and the threaded aperture 219 and into the bore 129 and the threaded aperture 249 to accommodate a smaller diameter electrical fixture plate. In some embodiments, the bore 129 and the threaded aperture 249 can be configured to receive a fastener (not pictured) having a smaller diameter width than the fastener 143, the fastener extending through the bore 129 on the emboss tab 113 and the emboss tab 117 and threadingly engaging the pair of threaded apertures 249 on the bracket 203 to mount the smaller diameter electrical fixture plate to the fasteners.

Figure 8:
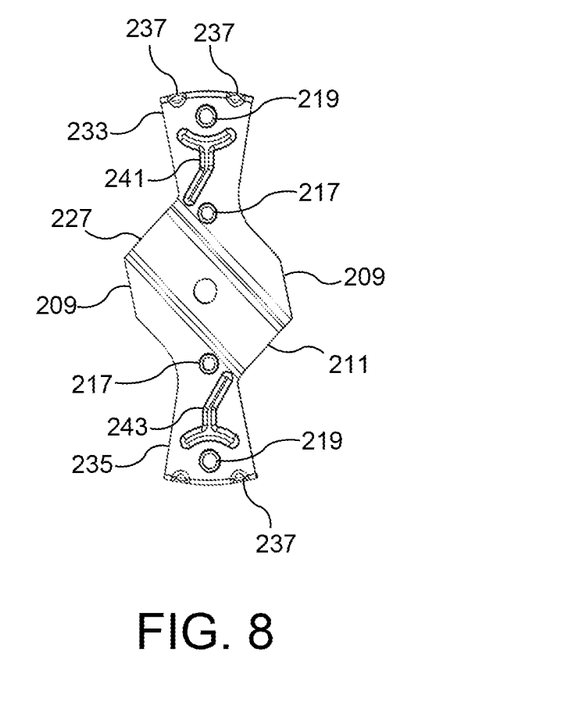
FIG. 8 shows a perspective view of the bracket, according to some embodiments.
Figure 9:
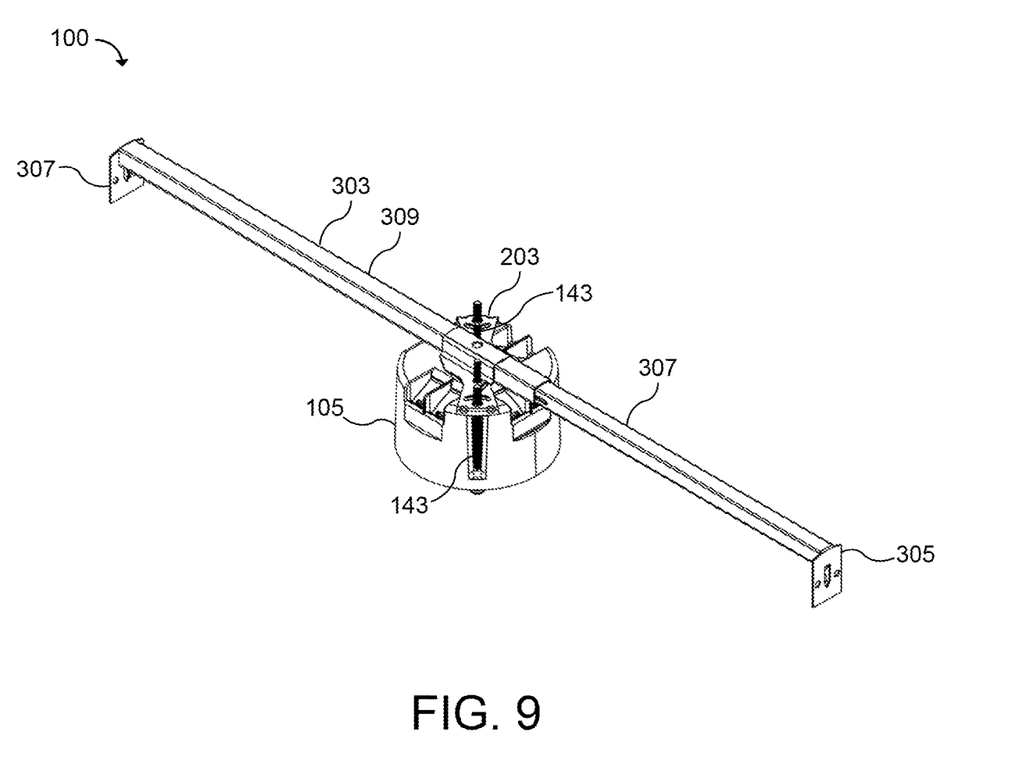
FIG. 9 shows a perspective view of the ceiling box and a bar hanger, according to some embodiments.

FIG. 8 shows a perspective view of the bracket 203, according to some embodiments. FIG. 9 shows a perspective view of the ceiling box 100 and a bar hanger 303, according to some embodiments.

In some embodiments, the bracket 203 can include a channel 227 formed by the second portion 211 offset from the first portion 209 and extending parallel to the first portion 209, the channel 227 defining a space between the bracket 203 and housing 105 to receive a bar hanger 303. In some embodiments, the second portion 211 can be contiguously connected to the first portion 209 along two sides of the second portion 211, the first portion 209 forming a first segment and a second segment and extending along opposing sides of the second portion 211. In some embodiments, the housing 105 can be configured to receive the bar hanger 303 between the bracket 203 and the housing 105 through a length of the channel 227.

In some embodiments, the ceiling box 100 can include a bar hanger 303. The bar hanger can extend between two structural members to mount the ceiling box 100 to the structural members. The bar hanger 303 can be disposed between the housing 105 and the bracket 203 at the channel 227 and extend away from the ceiling box 100 towards the two structural members. Each end of the bar hanger 303 can include a mounting plate 305 to attach the bar hanger 303 to each respective structural member. Further, in some embodiments, each mounting plate 305 can include a plurality of mounting holes 221 to attach the bar hanger 303 to the structural members. In some embodiments, the bar hanger 303 can be a fixed length bar member.

In some embodiments, the bar hanger 303 can include an inner bar 307 having a first dimension and an outer bar 309 having a second dimension, the inner bar 307 including a second channel extending through the inner bar 307 along a lengthwise axis, the inner bar 307 fitting inside the second channel to extend from the second channel to telescopically adjust a length of the bar hanger 303 to engage two structural members of varying distances to install the ceiling box 100 to the structural members. In some embodiments, the outer bar 309 of the bar hanger 303 can be disposed between the housing 105 and the bracket 203. Further, in some embodiments, the outer bar 309 can include a tab to prevent the bracket 203 from sliding off the outer bar 309 and onto the inner bar 307. In some embodiments, the outer bar 309 can include a retaining tab to retain the inner bar 307 in the second channel of the outer bar 309, the inner bar 307 further including an aperture on a corresponding surface of the inner bar 307 to engage the retaining tab when the inner bar 307 is extended from the outer bar 309 a fixed distance.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

disposed directly between both of the two other structural elements such that the particular structural component is in direct contact with both of the two other structural elements;

disposed directly next to only one of the two other structural elements such that the particular structural component is in direct contact with only one of the two other structural elements;

disposed indirectly next to only one of the two other structural elements such that the particular structural component is not in direct contact with only one of the two other structural elements, and there is another element which juxtaposes the particular structural component and the one of the two other structural elements;

disposed indirectly between both of the two other structural elements such that the particular structural component is not in direct contact with both of the two other structural elements, and other features can be disposed therebetween; or any combination(s) thereof.

As used herein "embedded" means that a first material is distributed throughout a second material.

What is claimed is:

1. An apparatus for mounting an electrical fixture to a structural member, the apparatus comprising:
a housing having a rear wall at a first end, at least one sidewall extending from the first end to a second end and forming an opening at the second end, and wherein the housing comprises:
a first emboss tab at a first side of the at least one sidewall,
a second emboss tab at a second side of the at least one sidewall,
a pair of screw holes extending through the rear wall,
a pair of first bores extending through the housing at the first emboss tab and the second emboss tab, and
a pair of second bores extending through the housing at the first emboss tab and the second emboss tab; and
a bracket, the bracket including:
a first portion on a first plane,
a second portion on a second plane,
a pair of first threaded apertures extending through the first portion,
a pair of second threaded apertures extending through the first portion, and
a plurality of mounting holes extending through the second portion and configured to receive a plurality of fasteners to mount the bracket to the structural member;
wherein the pair of first threaded apertures are configured to align with the pair of screw holes and the pair of second threaded apertures are configured to align with the pair of first bores.

2. The apparatus of claim 1, further comprising:
a pair of first fasteners at the pair of screw holes to attach the housing to the bracket; and
a pair of second fasteners at the pair of first bores to engaging the bracket,
wherein the pair of second fasteners are configured to engage a first fixture plate.

3. The apparatus of claim 1, further comprising:
wherein the pair of second bores is configured to engage a pair of third fasteners inserted into the pair of second bores; and
wherein the pair of second bores mechanically deform in response to the third fasteners being threadingly inserted into the pair of second bores;
wherein the pair of third fasteners are configured to engage a second fixture plate.

4. The apparatus of claim 1, wherein the first portion extends in a first direction on the first plane, and wherein the bracket further comprises:
a third portion extending in a second direction on the first plane;
wherein an aperture of the pair of second threaded apertures is disposed on the third portion.

5. The apparatus of claim 1, wherein the bracket further comprises:
wherein the first portion and the second portion intersect to form approximately a 90° angle, and
wherein the bracket further includes a gusset disposed at an intersection of the first portion and the second portion.

6. The apparatus of claim 4, wherein the bracket further comprises:
a fourth portion extending in a third direction on the first plane,
wherein the fourth portion is opposite from the third portion at the first portion;
wherein the other aperture of the pair of second threaded apertures is disposed on the fourth portion.

7. The apparatus of claim 6, wherein an axis of the second direction is at approximately a 45° angle from an axis of the first direction.

8. The apparatus of claim 6, wherein the bracket further comprises:

wherein the second portion is offset from the first portion to form a channel extending between a first segment and a second segment of the first portion, wherein the bracket is configured to receive a bar hanger between the bracket and the housing through the channel, and wherein the bar hanger is configured to mount the bracket to the structural member.

9. The apparatus of claim 8, wherein the bar hanger comprises an outer bar and an inner bar, the outer bar having a second channel along a lengthwise axis of the outer bar, wherein the inner bar fits inside the second channel to extend from the second channel to telescopically adjust a length of the bar hanger.

10. The apparatus of claim 6, wherein the bracket further comprises:

a first flange disposed at an end of the third portion, and
a second flange disposed at an end of the fourth portion,
wherein the first flange and the second flange extend around the housing towards the second end.

11. The apparatus of claim 10, wherein each of the first flange and the second flange further include at least one emboss portion at an intersection of the first flange or the second flange and the third portion and the fourth portion.

12. The apparatus of claim 6, wherein the bracket further comprises:

a first emboss segment disposed on the first portion,
a second emboss segment disposed on the third portion, and
a third emboss segment disposed on the fourth portion,
wherein the first emboss segment, the second emboss segment, and the third emboss segment provide support to a rigidity of the bracket.

13. A system for mounting electrical fixtures to a structural member, the system comprising:

a housing having a rear wall at a first end, at least one sidewall extending from the first end to a second end and forming an opening at the second end, the housing including:
a first emboss tab at a first side of the at least one sidewall,
a second emboss tab at a second side of the at least one sidewall,
a pair of screw holes extending through the rear wall,
a pair of first bores extending through the housing at the first emboss tab and the second emboss tab, and
a pair of second bores extending through the housing at the first emboss tab and the second emboss tab;
a bracket for mounting the housing to the structural member, the bracket including:
a first portion on a first plane at the first end of the housing, a second portion on a second plane,
a pair of first threaded apertures extending through the first portion and aligning with the pair of screw holes,
a pair of second threaded apertures extending through the first portion and aligning with the pair of first bores, and
a plurality of mounting holes extending through the second portion and configured to receive a plurality of fasteners;
a pair of first fasteners to attach the housing to the bracket;
a pair of second fasteners to threadingly engage the bracket,
wherein the pair of second fasteners are configured to engage a first fixture plate;
wherein the pair of first threaded apertures align with the pair of screw holes and the pair of second threaded apertures align with the pair of first bores;
wherein the pair of second bores mechanically deform in response to a pair of third fasteners being threadedly inserted into the pair of second bores to mount a second fixture plate.

14. The system of claim 13, wherein the first portion extends in a first direction, and wherein the bracket further comprises:

a third portion extending in a second direction on the first plane,
wherein an aperture of the pair of second threaded apertures is disposed on the third portion.

15. The system of claim 14, wherein the bracket further comprises:

a fourth portion extending in a third direction opposite the second direction on the first plane,
wherein the other aperture of the pair of second threaded apertures is disposed on the fourth portion.

16. The system of claim 15, wherein the second direction is angularly offset from the first direction by a 45° angle.

17. The system of claim 15, wherein the bracket further comprises:

wherein the first portion and the second portion intersect to form approximately a 90° angle, and
wherein the bracket further includes a gusset disposed at an intersection of the first portion and the second portion.

18. The system of claim 15, wherein the bracket further comprises:

wherein the second portion is offset from the first portion to form a channel extending between a first segment and a second segment of the first portion,
wherein the bracket is configured to receive a bar hanger between the bracket and the housing through the channel, and
wherein the bar hanger is configured to mount the bracket to the structural member.

19. The system of claim 15, wherein the bracket further comprises:

a first emboss segment disposed on the first portion,
a second emboss segment disposed on the third portion,
a third emboss segment disposed on the fourth portion,
a first flange disposed at an end of the third portion, and
a second flange disposed at an end of the fourth portion,
wherein the first emboss segment, the second emboss segment, and the third emboss segment provide added support to a rigidity of the bracket,
wherein the first flange and the second flange extend around a periphery of the housing towards the second end.

20. The system of claim 19, wherein each of the first flange and the second flange further include at least one emboss portion at an intersection of the first flange and the second flange and a respective third portion and the fourth portion.

* * * * *